(12) United States Patent
Kuroda et al.

(10) Patent No.: US 12,292,508 B2
(45) Date of Patent: May 6, 2025

(54) PROCESSING APPARATUS AND POINT CLOUD ELIMINATION METHOD

(71) Applicant: Hitachi Astemo, Ltd., Hitachinaka (JP)

(72) Inventors: Masayoshi Kuroda, Hitachinaka (JP); Kosuke Sakata, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 516 days.

(21) Appl. No.: 17/788,579

(22) PCT Filed: Sep. 8, 2020

(86) PCT No.: PCT/JP2020/033882
§ 371 (c)(1),
(2) Date: Jun. 23, 2022

(87) PCT Pub. No.: WO2021/065371
PCT Pub. Date: Apr. 8, 2021

(65) Prior Publication Data
US 2023/0034208 A1 Feb. 2, 2023

(30) Foreign Application Priority Data

Oct. 1, 2019 (JP) .................................. 2019-181145

(51) Int. Cl.
*G01S 17/89* (2020.01)
*G01S 17/931* (2020.01)

(52) U.S. Cl.
CPC ............ *G01S 17/89* (2013.01); *G01S 17/931* (2020.01)

(58) Field of Classification Search
CPC ........ G01S 17/89; G01S 17/931; G01S 17/42; G01S 7/4802; G01S 7/4808
See application file for complete search history.

(56) References Cited

U.S. PATENT DOCUMENTS 10,210,669 B1 2/2019 Cox
10,346,998 B1 * 7/2019 Anderberg ................ G06T 7/11
(Continued)

FOREIGN PATENT DOCUMENTS

CN 109934637 A 6/2019
JP 2002-5649 A 1/2002
(Continued)

OTHER PUBLICATIONS

Kusenbach et al, A New Geometric 3D LiDAR Feature for Model Creation and Classification of Moving Objects, 2016, IEEE Intelligent Vehicles Symposium, pp. 1-7. (Year: 2016).*
(Continued)

*Primary Examiner* — Kathleen M Broughton
(74) *Attorney, Agent, or Firm* — Crowell & Moring LLP

(57) ABSTRACT

Provided are a processing apparatus and a point cloud elimination method that can suppress point cloud processing load even if the number of points included in point clouds increases due to realization of high resolution of an apparatus that acquires point clouds of an object. The processing apparatus includes a memory (storage apparatus) and a processor. The memory stores data of a point cloud of an object. The processor eliminates data of a second point (subject point) that is included in the point cloud and is next to a first point (previous point) that is included in the point cloud from the data of the point cloud when the difference between the distance to the first point and the distance to the second point is smaller than a threshold (first threshold Th1) (Step 1903: YES) (Step 1908).

9 Claims, 14 Drawing Sheets

(56) References Cited

U.S. PATENT DOCUMENTS

| | | |
|---|---|---|
| 2013/0028482 A1 | 1/2013 | Crews |
| 2018/0189578 A1* | 7/2018 | Yang .................. G01C 21/3635 |
| 2019/0089942 A1 | 3/2019 | Hanamoto |
| 2019/0383941 A1* | 12/2019 | Siddiqui .................. G01S 17/89 |
| 2020/0320339 A1* | 10/2020 | Rawashdeh ............. G01S 17/42 |

FOREIGN PATENT DOCUMENTS

| | | |
|---|---|---|
| JP | 2018-206038 A | 12/2018 |
| JP | 2019-57918 A | 4/2019 |

OTHER PUBLICATIONS

Wang et al, A New Method of 3D Point Cloud Data Processing in Low-speed Self-driving Car, 2019, IEEE 3rd Advanced Information Management, Communicates, Electronic and Automation Control Conference, pp. 1-5. (Year: 2019).*

Wen et al., Research on 3D Point Cloud De-Distortion Algorithm and Its Application on Euclidean Clustering, 2019, IEEE Access, 7(2019): 86041-86053. (Year: 2019).*

Chiang et al., Fast Multi-Resolution Spatial Clustering for 3D Point Cloud Data, 2019, IEEE International Conference on Systems, Man and Cybernetics, pp. 1-6. (Year: 2019).*

Chen et al, A method for dynamic simplification of massive point cloud, 2016, IEEE International Conference on Industrial Technology, pp. 1-5. (Year: 2016).*

Lv et al., Removing Redundancy Point Clouds Based on Multi-view Geometric, 2015, International Conference on Logistic Engineering, Management and Computer Science, pp. 1-5. (Year: 2015).*

International Search Report (PCT/ISA/210) issued in PCT Application No. PCT/JP2020/033882 dated Dec. 22, 2020 with English translation (four (4) pages).

Japanese-language Written Opinion (PCT/ISA/237) issued in PCT Application No. PCT/JP2020/033882 dated Dec. 22, 2020 (five (5) pages).

* cited by examiner

LIDAR: LOW RESOLUTION

FIG. 2B
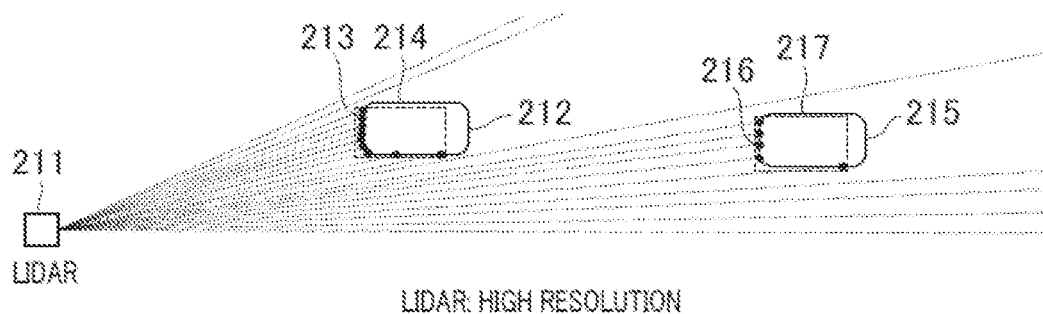
FIG. 3
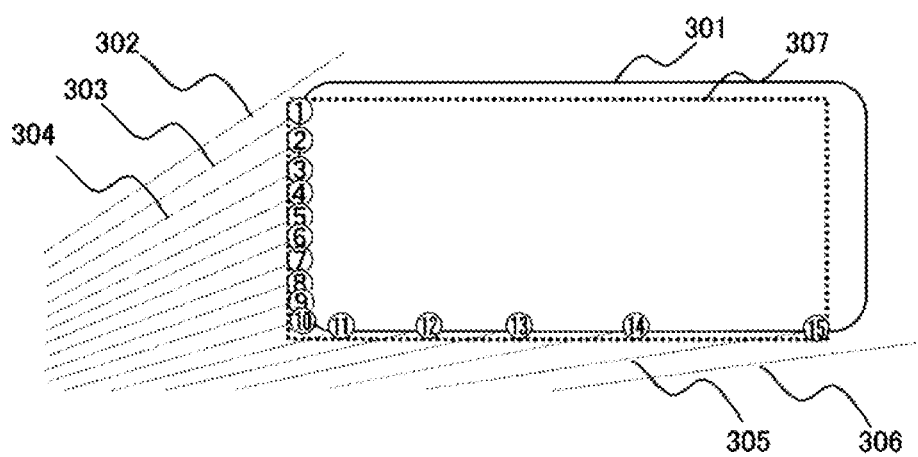
FIG. 4
| POINT CLOUD NUMBERS | ① | ② | ③ | ④ | ⑤ | ⑥ | ⑦ | ⑧ | ⑨ | ⑩ | ⑪ | ⑫ | ⑬ | ⑭ | ⑮ |
|---|---|---|---|---|---|---|---|---|---|---|---|---|---|---|---|
| DISTANCES | L1 | L2 | L3 | L4 | L5 | L6 | L7 | L8 | L9 | L10 | L11 | L12 | L13 | L14 | L15 |
| DISTANCE DIFFERENCES | D1 | D2 | D3 | D4 | D5 | D6 | D7 | D8 | D9 | D10 | D11 | D12 | D13 | D14 | |
401
402

EXAMPLE OF AREA REDUCTION
IN HORIZONTAL DIRECTION

EXAMPLE OF AREA REDUCTION
IN VERTICAL DIRECTION

PROCESSING APPARATUS AND POINT CLOUD ELIMINATION METHOD

TECHNICAL FIELD

The present invention relates to a processing apparatus and a point cloud elimination method.

BACKGROUND ART

In realizing an automated driving vehicle, it is necessary to grasp the position and movement of an object in the surroundings of the vehicle. In order to detect and recognize an object in the surroundings of the vehicle more accurately by increasing redundancy, there increase cases where Lidar that can more accurately measure the distance to an object is mounted in addition to a camera and a radar.

In order to detect a distant object and additionally recognize the shape of the object more accurately, there increase cases where high-resolution Lidar is used that can acquire a larger number of pieces of point cloud data by having reduced horizontal/vertical sensing intervals to realize higher resolution.

However, the processing amount for each point cloud increases because the number of pieces of point cloud data increases along with realization of high resolution, and accordingly, there is a fear that a recognition process of an object in real time cannot be performed due to the increase in load.

There is a method like one disclosed in JP-2018-206038-A (Patent Document 1) in which the amount of point cloud data is reduced by making the coordinate point density of point cloud data equal to or lower than a predetermined threshold according to a distance.

PRIOR ART DOCUMENT

Patent Document

Patent Document 1: JP-2018-206038-A

SUMMARY OF THE INVENTION

Problem to be Solved by the Invention

Patent Document 1 does not describe by which method and at which portions point clouds are to be eliminated to make the coordinate point density of point clouds equal to or lower than the predetermined coordinate point density in order to make the coordinate point density of point clouds equal to or lower than the predetermined threshold, and according to Patent Document 1, elimination of point clouds is performed on the basis of only the values of coordinate point densities, independently of features of the shape of an object to be detected.

An object of the present invention is to provide a processing apparatus and a point cloud elimination method that can suppress point cloud processing load even if the number of points included in point clouds increases due to realization of high resolution of an apparatus that acquires point clouds of an object.

Means for Solving the Problem

In order to achieve the object described above, a processing apparatus which is an example of the present invention includes: a storage apparatus that stores data of a point cloud of an object; and a processor that eliminates data of a second point that is included in the point cloud and is next to a first point that is included in the point cloud from the data of the point cloud when a difference between a distance to the first point and a distance to the second point is smaller than a first threshold.

Advantages of the Invention

According to the present invention, point cloud processing load can be suppressed even if the number of points included in point clouds increases due to realization of high resolution of an apparatus that acquires point clouds of an object. Problems, configurations, and advantages other than those described above are made clear by the following explanation of embodiments.

BRIEF DESCRIPTION OF THE DRAWINGS

FIG. 2B is an explanatory diagram depicting how point clouds are applied to vehicles depending on distances (high resolution).

FIG. 3 is an explanatory diagram depicting locations where radiated laser beams are applied to a vehicle.

FIG. 4 is a table of the distances to point clouds and distance differences.

MODES FOR CARRYING OUT THE INVENTION

Figure 1:
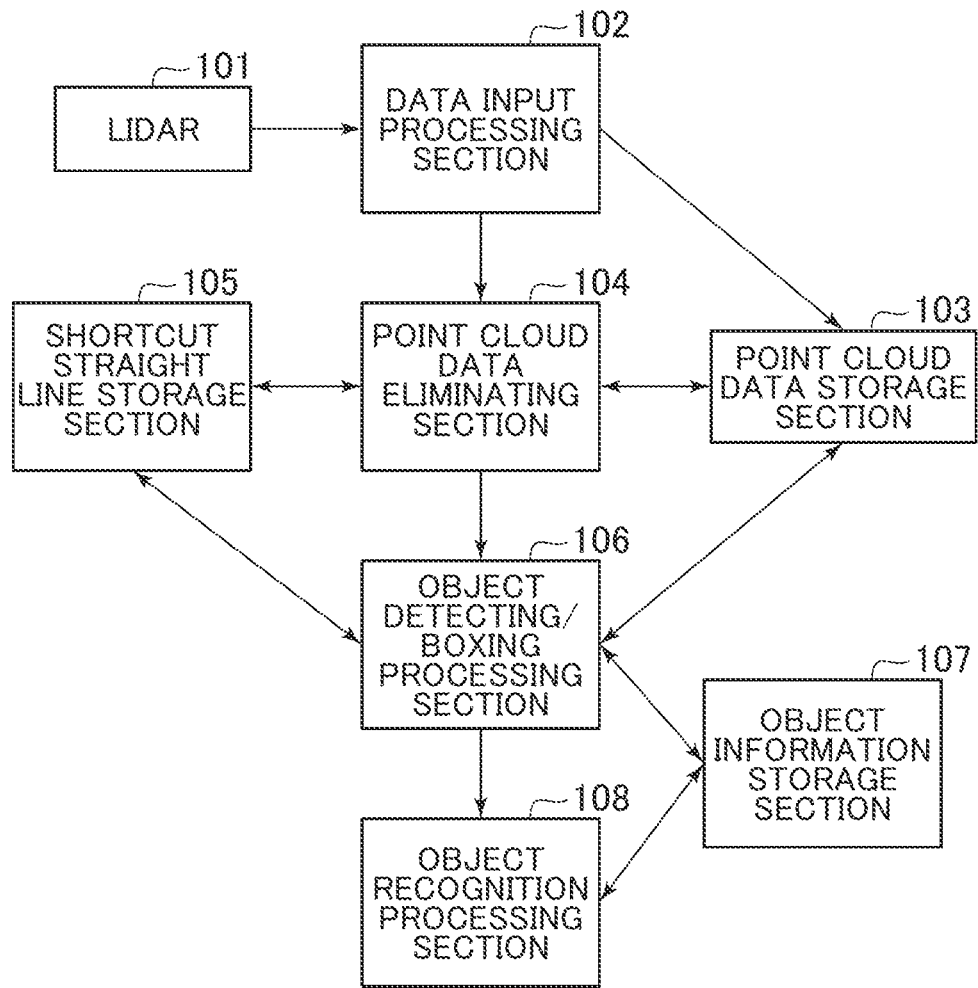
FIG. 1 is a block diagram depicting an embodiment of a point cloud data elimination process.

The present embodiment relates to an object detection method and a method of eliminating point cloud data acquired by a laser radar (hereinafter, called Lidar [Light Detection and Ranging]) that calculates the distance to an object by detecting a beam that is reflected from an object when the object is irradiated with a laser beam, recognizes presence or absence of and the size and shape of the object in the surroundings.

The embodiment is explained below by using figures. Note that although each point cloud includes a plurality of points, a point cloud represents one point in some cases in the following explanation. For example, a point cloud that is given a reference character like a point cloud (1) represents one point.

FIG. 1 is a block diagram depicting an embodiment of a point cloud data elimination process.

A Lidar 101 transmits, in a predetermined format, point cloud data of an object obtained by receiving reflection beams of radiated lasers, to a data input processing section 102.

The data input processing section 102 deciphers the received point cloud data in the data format, takes out values of horizontal angles, vertical angles, distances, and reflection intensities of each piece of the point cloud data, and stores the values on a point cloud data storage section 103.

A point cloud data eliminating section 104 decides whether or not the point cloud data read out from the point cloud data storage section 103 matches elimination conditions, gives point cloud data that can be eliminated a flag representing that the data itself has been eliminated, and updates values in the point cloud data storage section 103.

Further, when point cloud data is eliminated, a shortcut straight line whose end points are point clouds (two adjacent points in remaining point clouds) before and after the eliminated point cloud data is generated, and stored on a shortcut straight line storage section 105.

An object detecting/boxing processing section 106 converts point cloud data in the point cloud data storage section 103 into data in an orthogonal coordinate system, adds the data in the orthogonal coordinate system to the point cloud data storage section 103, and uses point cloud data in the point cloud data storage section 103 and shortcut straight line data in the shortcut straight line storage section 105 to box a object to be detected. Then, the object detecting/boxing processing section 106 collates data about the position, the size, and the like of the box with object data stored on an object information storage section 107. The object detecting/boxing processing section 106 updates values when there is an object that is considered to be identical, and newly adds values when there is not an identical object.

An object recognition processing section 108 performs identification of objects and calculation of speeds on the basis of data stored on the object information storage section 107, and updates the stored information.

Information about objects recognized by the Lidar and stored on the object information storage section 107 is subjected to a fusion process along with results of recognition by other sensors such as cameras or radars, and is used for generation of a travel path and the like.

Note that the data input processing section 102, the point cloud data eliminating section 104, the object detecting/boxing processing section 106, and the object recognition processing section 108 may be realized as functionalities of a processor such as a CPU (Central Processing Unit), or may be realized as a circuit such as a FPGA (Field-Programmable Gate Array). In addition, the point cloud data storage section 103, the shortcut straight line storage section 105, and the object information storage section 107 include a storage apparatus such as a memory, for example.

In the present embodiment, a processing apparatus such as a vehicle-mounted ECU (Electronic Control Unit) includes a memory (storage apparatus), a CPU (processor), an input/output circuit, and the like.

Figure 2A:
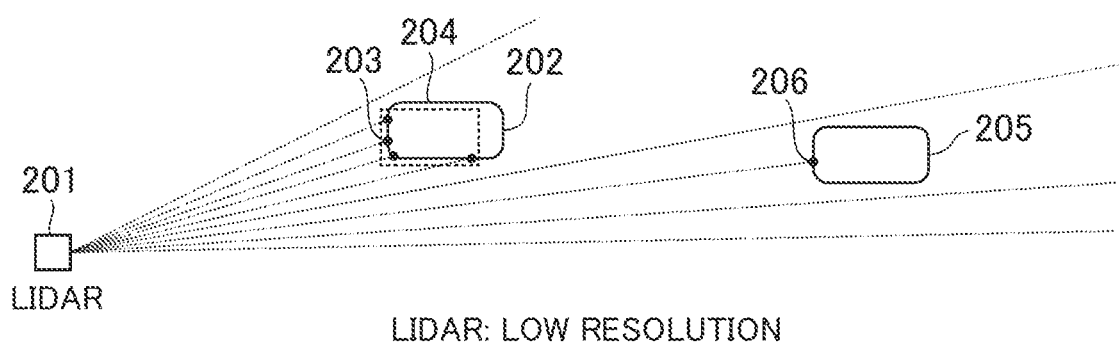
FIG. 2A is an explanatory diagram depicting how point clouds are applied to vehicles depending on distances (low resolution).

FIGS. 2A and 2B are figures for depicting how data is generated from point clouds applied to (correspond to) objects according to the resolution of and distances from Lidars, and represent how point clouds are applied to vehicles in the horizontal direction in one layer which is at a vertical angle corresponding to a height of the point clouds applied to the vehicles (a plane on which point clouds obtained by performing scanning at a predetermined vertical angle are positioned).

FIG. 2A depicts an example of a case where a low-resolution Lidar is used, and point cloud data 203 is obtained when laser beams radiated from a low-resolution Lidar 201 are applied to a vehicle 202 in the surroundings.

Note that although not all pieces of data generated from point clouds that are applied to the vehicle 202 are given reference characters in FIG. 2A, other pieces of data generated from point clouds located on the vehicle 202 and represented by the same black circles are also point cloud data of the vehicle 202.

A circumscribing rectangle 204 is one fitted with a rectangle including the point cloud data 203 represented by four points, and an object (in this case, a vehicle) is recognized as being present at the position of the circumscribing rectangle.

In a case of a distant vehicle 205, the horizontal intervals between laser beams spread. Accordingly, even if the vehicle 205 has the same size as the vehicle 202, only one point of point cloud data 206 is applied, and it is barely possible to detect that there is some object. However, since there is not necessary and sufficient number of point clouds, a circumscribing rectangle cannot be created by fitting a rectangle, and it is not possible to recognize that there is the vehicle 205.

On the other hand, in FIG. 2B depicting an example of a case where a high-resolution Lidar is used, point cloud data 213 is obtained when laser beams radiated from the high-resolution Lidar 211 are applied to a vehicle 212 in the surroundings. Note that, similarly to FIG. 2A, although not all pieces of point cloud data are given reference characters, other pieces of point cloud data generated from point clouds on the vehicle 212 and represented by the same black circles are also point cloud data of the vehicle 212.

A circumscribing rectangle 214 is one fitted with a rectangle including the point cloud data 213, and an object (in this case, a vehicle) is recognized as being present at the position of the circumscribing rectangle.

In a case of a distant vehicle 215, since the resolution of laser beams is high, five points of point clouds of point cloud data 216 are applied and a circumscribing rectangle 217 can be created by fitting a rectangle even in the case of a distance at which only one point is applied as in the example of the vehicle 205 in FIG. 2A. Thereby, it becomes possible, for a vehicle that cannot be recognized due to the low-resolution Lidar, to be detected by using the high-resolution Lidar.

By using a high-resolution Lidar in this manner, it becomes possible to detect/recognize a more distant vehicle; however, there is the number of pieces of point cloud data necessary and sufficient for recognizing the vehicle 212 in the surroundings, that is, for creating a circumscribing rectangle, there is no influence on a recognition result even if the number of pieces of point cloud data increases due to high resolution, and the load of processing the point cloud data for creating the circumscribing rectangle increases by an amount corresponding to the increase in the number of pieces of the point cloud data.

In view of this, in an embodiment of the present invention, in order to reduce the processing load, a process is performed to eliminate point clouds that do not influence creation of a circumscribing rectangle while point clouds necessary for recognizing point cloud data as a vehicle are kept without any changes.

FIG. 3 depicts a case where laser beams radiated from the high-resolution Lidar 211 are applied to the back and side of a vehicle 301 in front and to the left of the high-resolution Lidar 211. Each point cloud is given a number.

Note that, whereas circled numbers are used in the figure, and numbers written in parentheses like a point cloud (1) are used as expressions in the specification, the same numbers represent the same point clouds.

A laser beam 302 is not applied to the vehicle 301, but reaches a distant point. The distance difference from a laser beam 303 that is applied to the vehicle 301 at the position of a point cloud (1) is great. Accordingly, where the distance difference between the adjacent laser beams is greater than a set threshold, it is determined that the laser beam 303 and subsequent laser beams are applied to another object. The point cloud (1) to which the laser beam 303 is applied is determined as an end of the object, and a distance L1 corresponding to a point cloud number (in this case, (1)) is stored in a distance 401 in FIG. 4 in a point cloud information management table in FIG. 4.

Whereas only distances are stored in the example explained in FIG. 4, information about a horizontal/vertical angle of each point cloud may be also stored together.

It is determined that a point cloud to which a laser beam 304, which is next to the laser beam 303, is applied is applied to the same object as that to which the laser beam 303 is applied because the distance difference between the laser beam 304 and the laser beam 303 is smaller than the threshold. A distance L2 of the laser beam 304 is stored in a location corresponding to a point cloud (2) in the point cloud information management table in FIG. 4. Similarly, when the distance difference from the next laser beam does not exceed the threshold, a distance Ln of a point cloud (n) is additionally written in a distance 401 in the point cloud information management table in FIG. 4.

To a laser beam 305, the distances to point clouds are additionally written, but a laser beam 306 is not applied to the vehicle 301, and the distance difference from the laser beam 305 exceeds the threshold. Accordingly, it is determined that the laser beam 306 and subsequent laser beams are applied to another object, and a point cloud (15) to which the laser beam 305 is applied is an end of the object. The point cloud (1) to the point cloud (15) in the point cloud information management table in FIG. 4 are managed as the same one object, and treated as a subject point cloud from which a circumscribing rectangle is created. Thus, a circumscribing rectangle 307 is the created circumscribing rectangle.

If the circumscribing rectangle is superimposed on the circled numbers in the figure, it becomes difficult to read the numbers, and therefore, the circumscribing rectangle 307 is drawn outside the circled numbers for convenience. Although there are spaces between the positions of the back and side of the vehicle 301 and the circumscribing rectangle 307 in the figure, there are no spaces between the circumscribing rectangle 307 and the positions of the back and side of the vehicle 301 because actually the circumscribing rectangle 307 lies along the center points of the circled numbers.

Note that, even where the laser beam 302 is shorter than the laser beam 303 due to presence of an obstacle such as another vehicle on the nearer side, the obstacle is determined, from the laser beam 303, to be included in one object as long as the distance difference between the laser beam 302 and the laser beam 303 is greater than the threshold.

In addition, when there are no objects in front of the laser beam 302 and the laser beam 306, and reflection beams cannot be received, and thus distances cannot be measured, a process similar to the process performed when a distance exceeds the threshold is performed.

Next, in FIG. 4, the distance difference between the point cloud (1) and the point cloud (2), that is, L2−L1, is defined as D1, and stored in a distance difference 402. Subsequently, results of L(n+1)−Ln are calculated as Dn, and the distance differences between adjacent point clouds are calculated, and stored in distance differences 402 in FIG. 4.

Next, a point cloud elimination method according to an embodiment of the present invention is explained.

Elimination of point clouds is required to be performed so as not to change the shape of a circumscribing rectangle to be generated, and a frame is fitted so as to include point clouds that are located at outermost positions. Accordingly, there is a fear that the shape of a circumscribing rectangle changes if end points, inflection points that are corners, protruding portions that are sticking out, and the like are eliminated, and therefore, they need to be kept uneliminated.

On the other hand, where point clouds lie next to each other linearly or in other similar cases, influence on the shape of a circumscribing rectangle is small even if point clouds at the intermediate portion are eliminated and replaced by a shortcut straight line, thus the point clouds are eliminated.

(Example in which Some of Point Clouds Form Straight Lines)

Figure 5:
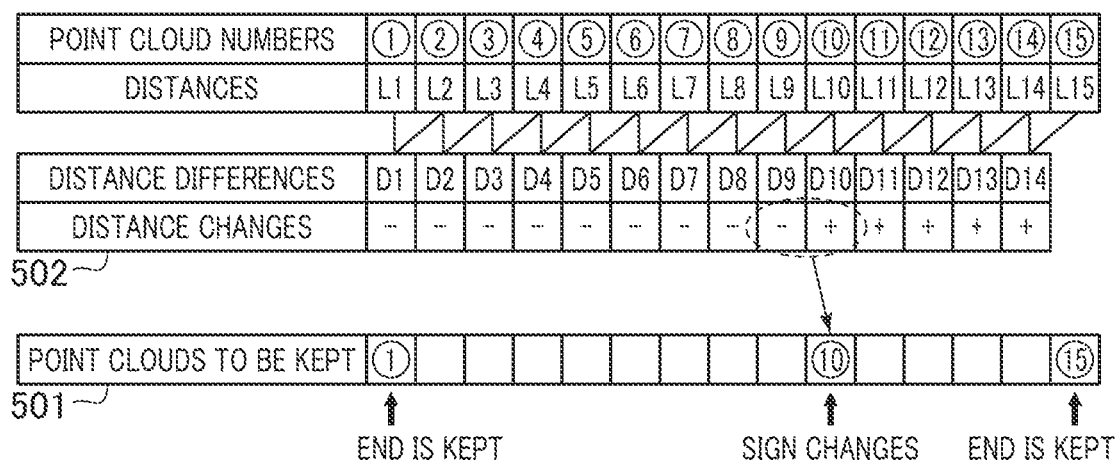
FIG. 5 is a table of distance changes between point clouds and point clouds to be kept.

Specifically, if an explanation is given about an example of a case of a row of point clouds in FIG. 4, first, points at both ends, that is, the point cloud (1) and the point cloud (15), are kept uneliminated, and are stored in point clouds to be kept 501 in FIG. 5.

Next, in order to sense point clouds of vertices of corners, first, increase and decrease, that is, the tendency of change, in the distance differences D1 to D14 calculated on the basis of the distances L1 to L15 of the point clouds are determined. Since the distance to the point cloud (2) is shorter when the distances to the point cloud (1) and the point cloud (2) are compared with each other, the sign of D1 is − (minus) which means the distance is decreasing, and − (minus) is stored in the field of a distance change 502 corresponding to D1. The decision is made also for D2 to D14, and the results are stored in distance changes 502.

At this time, while signs representing increase and decrease in the distance changes 502 of the portion from the point cloud (1) to the point cloud (10) are − (minus) because positions to which laser beams are applied get closer gradually, the signs of distance changes 502 of the portion from the point cloud (10) to the point cloud (15) to which laser beams are applied get farther gradually are + (plus).

Since the tendency of the distance change changes at the point cloud (10), it is determined that the point cloud (10) is a point cloud of a corner, and the point cloud (10) is kept also and is stored in a point cloud to be kept 501.

Rows of point clouds of portions where the signs of distance changes do not change consecutively lie along almost straight lines. Since creation of a circumscribing rectangle is not influenced even if the point clouds in these portions are eliminated and are replaced by shortcut straight lines, the other twelve point clouds are eliminated and are not added to point clouds to be kept 501.

As a result of implementing a process like the one described above, uneliminated point clouds to be kept are the point cloud (1), the point cloud (10), and the point cloud (15) as in the point clouds to be kept 501 in FIG. 5.

Here, since the point clouds located between the point clouds to be kept 501 can be determined as forming almost straight lines, the shapes between the point cloud (1) and the point cloud (10), and between the point cloud (10) and the point cloud (15) are stored as shortcut straight lines.

That is, the processor stores a straight line that connects one point that is kept uneliminated and the next point that is kept uneliminated to each other. Thereby, the shape of an object can be recognized with a small amount of data.

After a detected object is boxed, the shortcut straight lines are used when identification of the object or identification of its direction are performed on the basis of whether or not there is a straight line component and the length and direction of a straight line component.

Figure 6:
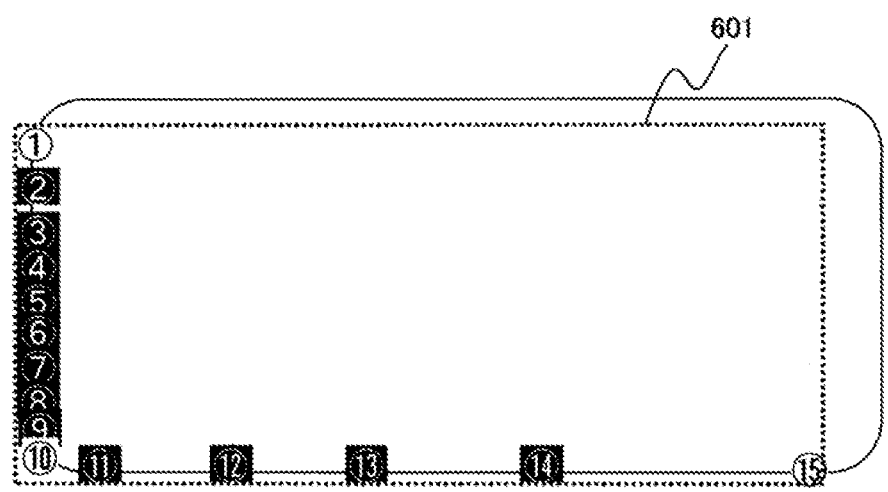
FIG. 6 is an explanatory diagram depicting locations of point clouds to be eliminated and point clouds to be kept.

If the eliminated point clouds are displayed in a black/white inverted manner, they are represented as in FIG. 6. If a circumscribing rectangle is created along the remaining point clouds, it becomes like a circumscribing rectangle 601, and thus a circumscribing rectangle which is similar to one that is obtained when point clouds are not eliminated is obtained.

Whereas an explanation is given with reference to FIG. 6 on the premise that there are no protrusions and recesses at all on the outer surface of a vehicle and point clouds are arrayed next to each other linearly, actual vehicles have protrusions and recesses, or there are measurement errors or the like of Lidars themselves; therefore, it is not always the case where point clouds on the back and side of a vehicle lie along straight lines.

Figure 7:
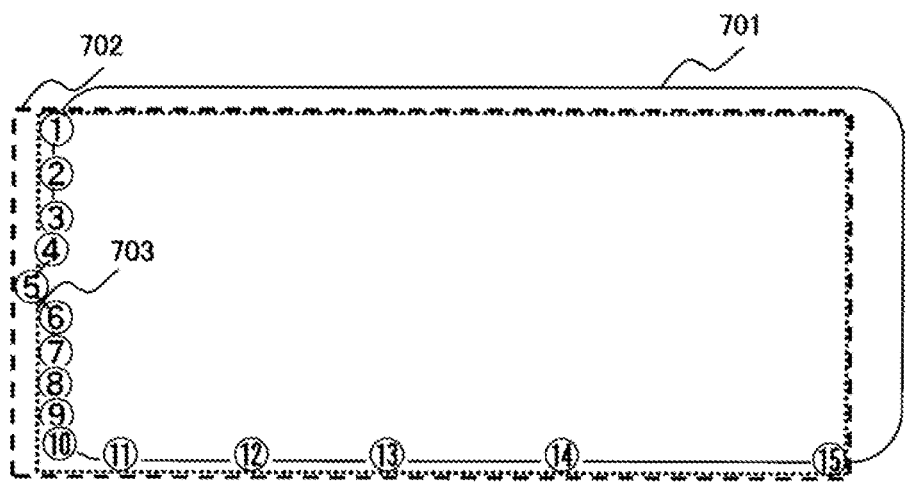
FIG. 7 is an explanatory diagram depicting locations of point clouds when there is a partial protrusion.

(Example in which Some of Point Clouds Form Protrusion)

Where part of the back of a vehicle 701 sticks out as a protrusion like the point cloud (5) as in FIG. 7, it is necessary to create such a circumscribing rectangle 702 that surrounds the point clouds. However, if the distance differences of the point cloud (5) from the point clouds before and after it are smaller than a threshold, the point cloud (5) may become a point cloud to be eliminated, a rectangle may be created like a circumscribing rectangle 703, and the protruding portion is positioned outside the frame undesirably; as a result, there is a fear that the position and the size of the vehicle 701 are recognized erroneously, and a collision or contact occurs.

Figure 8:
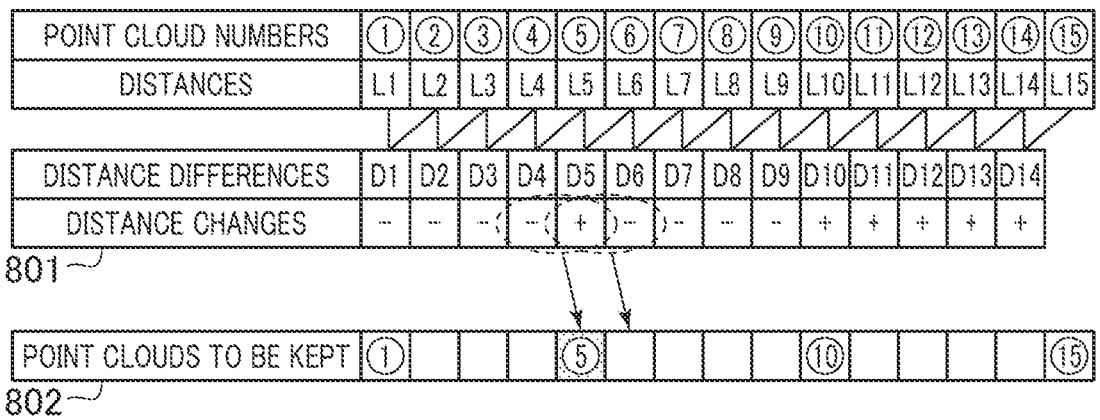
FIG. 8 is a table of distance changes between point clouds and point clouds to be kept when there is a partial protrusion.

In this case, as in FIG. 8, at the portion where the protrusion is present, D4 is a decrease (−) because the distance L5 to the point cloud (5) is shorter than the distance L4 to the point cloud (4), D5 is an increase (+) because the distance L6 to the point cloud (6) is longer than the distance L5 to the point cloud (5), D6 is a decrease (−) because the distance L7 to the point cloud (7) is shorter than the distance L6 to the point cloud (6), and the state of changes like distance changes 801 is observed.

At this time, it is considered that a portion where a change in distance change from a decrease (−) to an increase (+) is observed is an inflection point, and, since the detection position of an object at the portion is on the nearer side where the distance from a Lidar is shorter, it is considered that the portion is a protruding portion. In view of this, the point cloud (5) between D4 and D5 is kept, and the point cloud (5) is put in a point cloud to be kept 802.

Note that it is considered that a portion where a change in distance change from an increase (+) to a decrease (−) is observed is also an inflection point. For example, whereas L6 is longer than L5, L7 is shorter than L6, and the point cloud (6) is an inflection point, this represents that the point cloud (6) is located on the inner side relative to the point cloud (5) that contacts the circumscribing rectangle 702, and the point cloud (6) does not affect creation of the circumscribing rectangle 702 and need to be kept.

Figure 9:
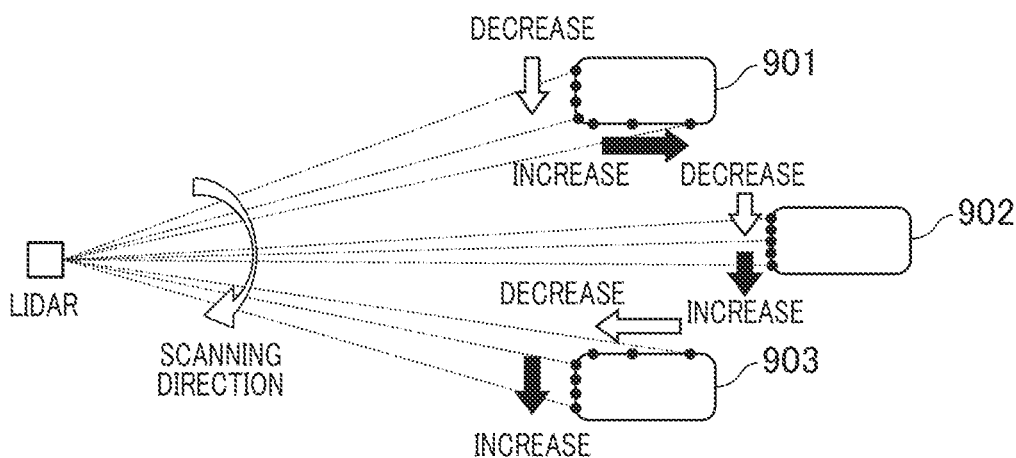
FIG. 9 is an explanatory diagram depicting increases and decreases in distance according to positions that accompany scanning.

In a case, like the one depicted in FIG. 9, of both a vehicle 901 whose position is in the left front of a Lidar and a vehicle 903 whose position is in the right front of the Lidar, the portion of a corner is an inflection point and a decreasing tendency turns into an increasing tendency because point clouds are applied to a plane on the nearer side that can be seen from the Lidar of a vehicle.

In addition, in a case of a vehicle 902 that is positioned in front of the Lidar, and only its back can be detected, decreases in distance change turn into increases at the position directly in front of the Lidar, which is not an inflection point but is located at the shortest distance from the Lidar. That is, unless the horizontal direction in which point clouds are scanned changes, decreases in distance change turn into increases independently of the positional relation with the vehicle.

Accordingly, there is no problem in detection of an inflection point at a corner portion even if point clouds are not kept at a portion where increases (+) of distance changes turn into decreases (−).

Here, since the point clouds located between the point clouds to be kept 802 can be determined as forming almost straight lines, the spaces between the point cloud (1) and the point cloud (5), between the point cloud (5) and the point cloud (10), and between the point cloud (10) and the point cloud (15) are stored as shortcut straight lines.

Where shortcut straight lines are created, if the point cloud (5) as a protrusion or the point cloud (10) as a rounded corner is used as an end point, a shortcut straight line created thereby does not coincide with an actual straight portion in some cases. Accordingly, shortcut straight lines may be created by connecting adjacent points to each other. In the example of point clouds to be kept 802, the spaces between the point cloud (2) and the point cloud (4), between the point cloud (6) and the point cloud (9), and between the point cloud (11) and the point cloud (14) are stored as shortcut straight lines.

(Example in which Some of Point Clouds Form Recesses)

Figure 10:
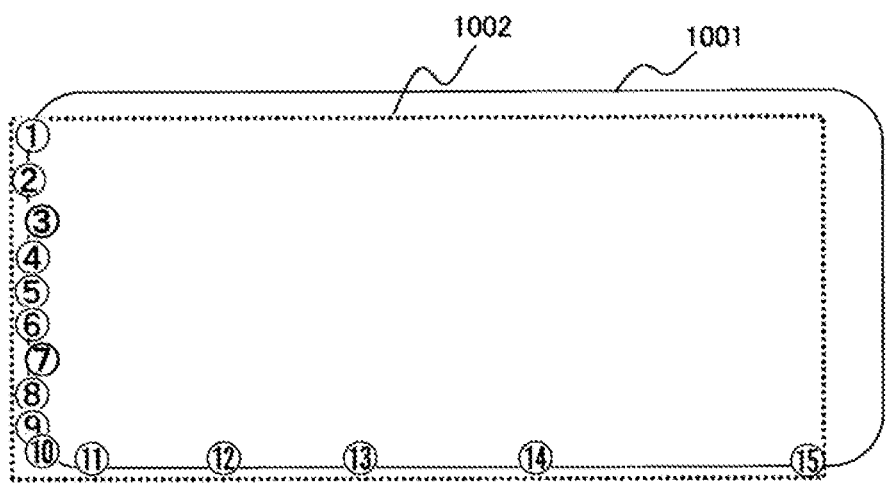
FIG. 10 is an explanatory diagram depicting locations of point clouds when there is a partial concavity.

Next, a processing method in a case like one depicted in FIG. 10 that the portions of the point cloud (3) and point cloud (7) on the back of a vehicle 1001 are recessed is explained.

Figure 11:
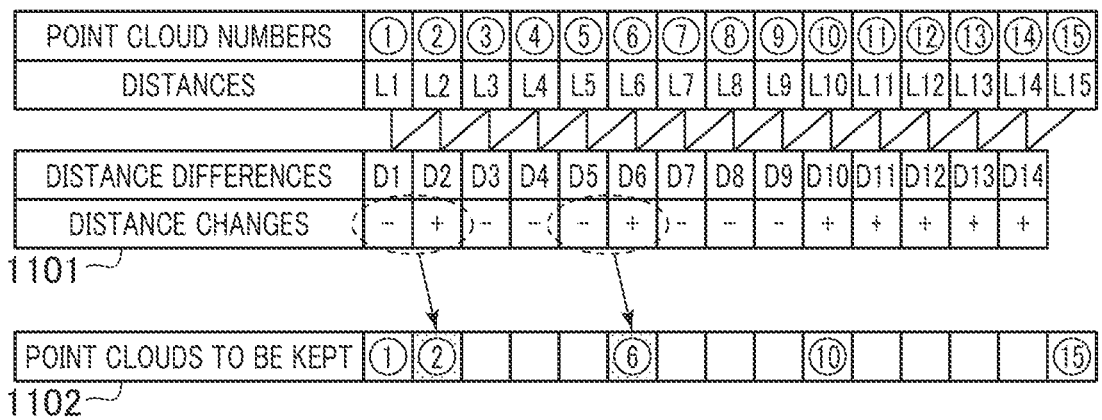
FIG. 11 is a table of distance changes between point clouds and point clouds to be kept when there is a partial concavity.

When the point cloud (3) and the point cloud (7) are applied to inner portions of recesses of the vehicle 1001, and the distance L3 and the distance L7 become long, as represented by distance changes 1101 in a table in FIG. 11, there are changes from decreases to increases at the distance differences D1 and D2, and at D5 and D6, and the point cloud (2) and the point cloud (6) are determined as change points and are not eliminated.

In addition, when there are changes from increases to decreases at the distance differences D2 and D3, and at D6 and D7, an elimination process is performed without keeping point clouds as explained with reference to FIG. 7 about the case where there is a protrusion.

As a result, as represented by point clouds 1102, as compared with the point clouds to be kept 501 in FIG. 5, the two points, the point cloud (2) and the point cloud (6), are kept uneliminated, and the number of point clouds to be eliminated decreases.

In this case, it is not possible to decide whether or not the point cloud (2) and the point cloud (6) are located outside a circumscribing rectangle 1002, and therefore, although the number of point clouds to be kept increases slightly, there is no problem in creation of the circumscribing rectangle 1002.

(Example in which Some of Point Clouds Form Protrusions and Recesses)

If point clouds are not arrayed next to each other on a straight line on the back of the vehicle 1001, and there are protrusions and recesses in this manner, even the portion of a recess is determined as an inflection point, and the point cloud is kept uneliminated undesirably, in some cases.

Figure 12:
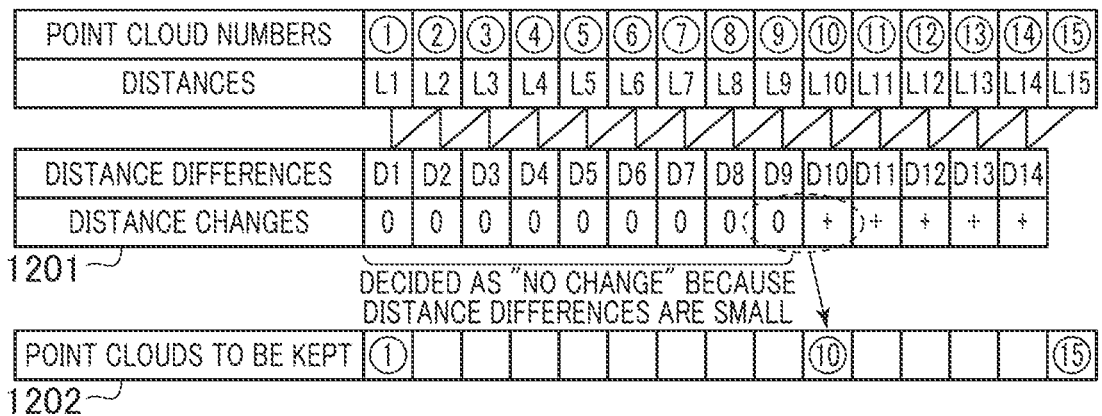
FIG. 12 is a table of distance changes between point clouds and point clouds to be kept when the distance changes are small.

In view of this, in order to eliminate point clouds effectively when there are no significant increases and decreases in distance change although there are small increases and decreases, distance changes are classified into three types, that is, not only into decreases (−) and increases (+), but also into no-change (0) which corresponds to a case where a change amount is within a predetermined threshold range, no matter whether the change amount is an increase or a decrease.

Where the threshold is set to a value that is greater than the distance difference between the point cloud (2) and the point cloud (3), but is smaller than the distance difference between the point cloud (10) and the point cloud (11), if the threshold is applied to the case of the point cloud pattern having recesses at the positions of the point cloud (3) and the point cloud (7) in FIG. 10, the distance differences D1 to D9 from the point cloud (1) to the point cloud (10) have values that are smaller than the threshold (a third threshold Th3), and determined as no-change (0), and thus results like distance changes 1201 in FIG. 12 are obtained. Here, the third threshold Th3 is several centimeters, and is smaller than a first threshold Th1 mentioned later.

By determining that there is a change point not only where there is a change from a decrease to an increase, but also where there is a change from no-change to an increase, the point cloud (10) is kept; however, by determining point clouds in consecutive no-change as point clouds to be eliminated similarly to point clouds in consecutive decreases, unlike the case depicted in FIG. 11 in which recesses are determined as inflection points, the point cloud (2) to the point cloud (9) are eliminated in the case of FIG. 12 in which distance changes in point clouds are determined as no-change when the change amounts are within the threshold range.

(Example in which Some of Point Clouds Form Gentle Curve)

Figure 13:
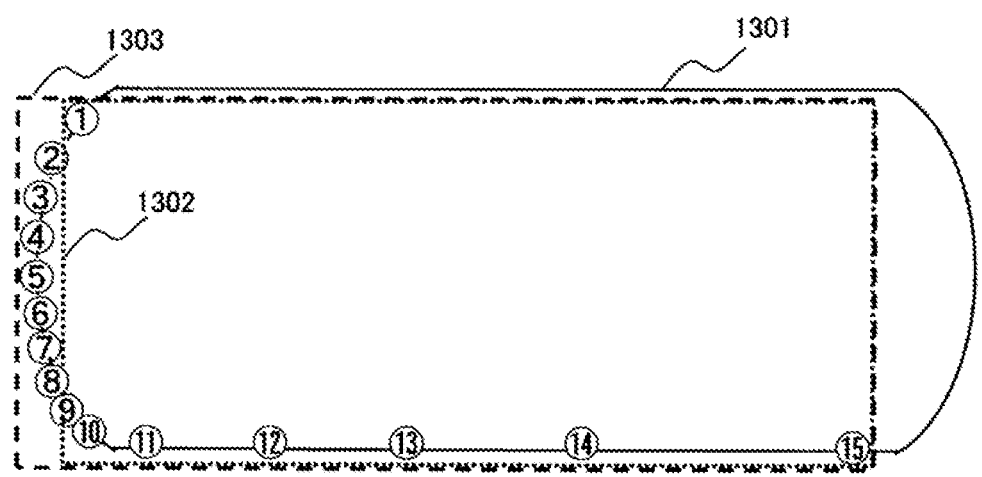
FIG. 13 is an explanatory diagram depicting locations of point clouds when there is a gentle curve.

Although the back of a vehicle has an almost straight line in the cases of the examples explained thus far, there are some cases in which change amounts are small, and the shape changes gradually and is curved gently as in a case of a vehicle 1301 in FIG. 13.

In this case, from the point cloud (2) to the point cloud (10), changes in the distance differences are determined as no-change according to the value of the threshold, and the point cloud (2) to the point cloud (9) are eliminated. Accordingly, point clouds to be kept are only the point cloud (1) and the point cloud (15) at both ends, and the point cloud (10) which is determined as a change point, and thus a circumscribing rectangle represented by a dotted line and denoted as 1302 is created. In this case, the circumscribing rectangle 1302 is determined being more distant or smaller than a circumscribing rectangle 1303 representing the actual position and size of a vehicle. Accordingly, there is a fear that there is a near-miss or contact with the vehicle 1301.

Accordingly, point clouds are kept at predetermined intervals even if elimination conditions are satisfied, and instead of creating one shortcut approximate straight line at a curved portion, a plurality of approximate straight lines along the curved portion are created so as to connect the point clouds to each other. Thereby, it is possible to avoid a situation where accurately grasping the contour of an object is impossible due to point clouds to be eliminated being located consecutively more than necessary.

(Method in which Point Clouds are Kept at Predetermined Intervals)

Where point clouds are to be kept at every predetermined angle, and point clouds are sent at constant intervals in the horizontal direction, point clouds are to be kept at predetermined intervals if point clouds are kept every predetermined number of point clouds. Accordingly, for example, where point clouds are to be kept after three points, the point cloud (5), the point cloud (9), and the point cloud (13) are kept as represented as point clouds to be kept 1401 in FIG. 14.

Figure 15:
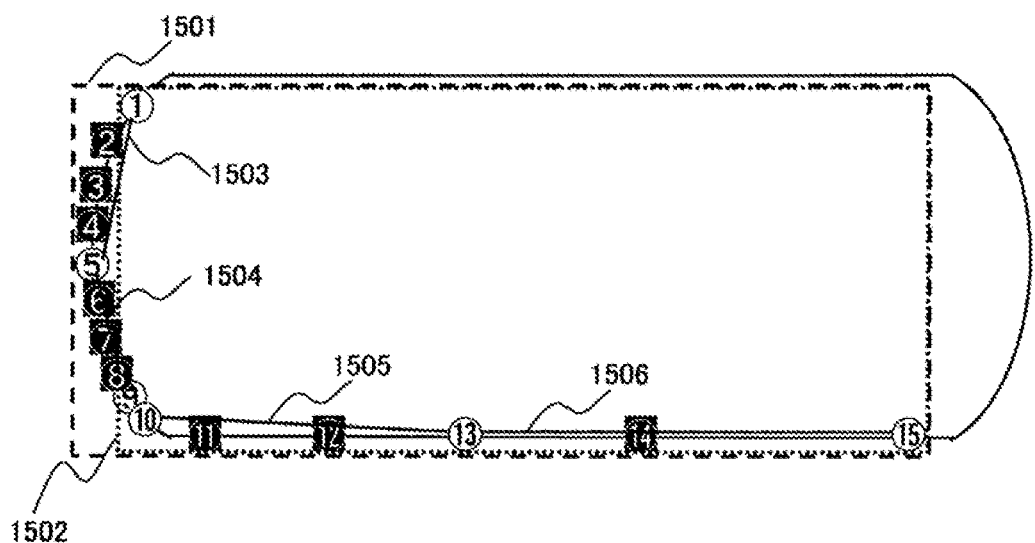
FIG. 15 is an explanatory diagram depicting locations of point clouds to be eliminated and point clouds to be kept when point clouds are kept at predetermined intervals.

FIG. 15 is a figure depicting point clouds to be eliminated displayed in a black/white inverted manner.

Figure 14:
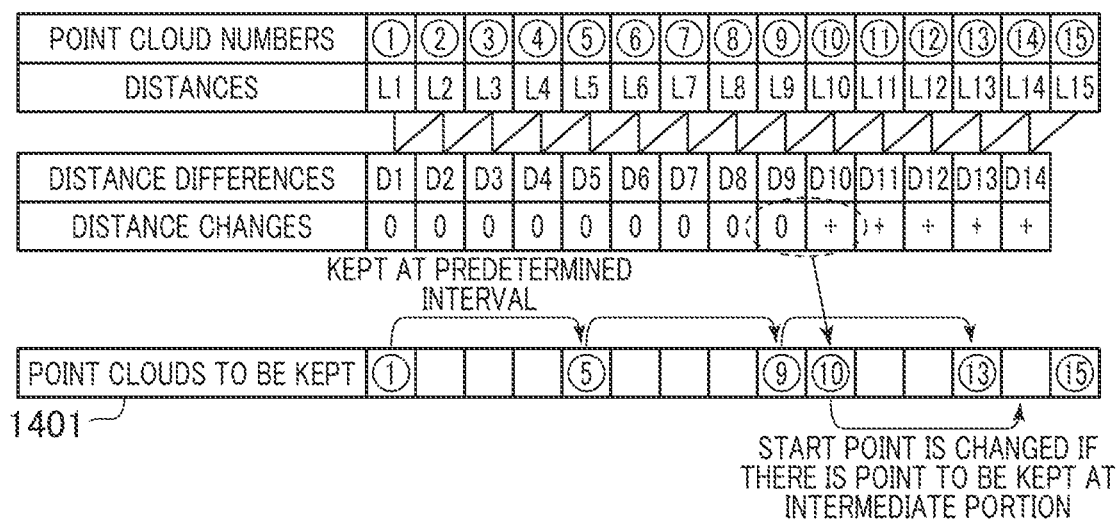
FIG. 14 is a table of distance changes between point clouds and point clouds to be kept when point clouds are kept at predetermined intervals.

Here, since point clouds in the point clouds to be kept 1401 in FIG. 14 can be regarded so as to be connected to each other with almost straight lines, the point cloud (1) and the point cloud (5), the point cloud (5) and the point cloud (9), the point cloud (10) and the point cloud (13), and the point cloud (13) and the point cloud (15) are connected to each other by a shortcut straight line 1503, a shortcut straight line 1504, a shortcut straight line 1505 and a shortcut straight line 1506, respectively, as in FIG. 15, and are stored as shortcut straight lines.

Note that, where there is a point cloud to be kept like the point cloud (10) which is sensed as a change point at an intermediate portion, counting of the number of point clouds may be resumed from the point cloud. In the example in FIG. 14, the point cloud (13), which is the fourth point from the point cloud (9), is kept; however, since the point cloud (10) as a change point is kept uneliminated, the point cloud (14), which is the fourth point from the point cloud (10), is kept and the point cloud (13) is eliminated.

Since a circumscribing rectangle is created by including the point cloud (5) therein, a circumscribing rectangle like a circumscribing rectangle 1501 is created, and the actual contour of a vehicle does not go out of the circumscribing rectangle 1501.

Where point clouds are thinned out every predetermined angle, intervals between point clouds to be kept widen as the distance to the position of an object increases. Accordingly, in order to prevent intervals between point clouds from becoming different significantly, horizontal angles at which point clouds are kept may be changed according to distances to objects such that the horizontal angles are larger for objects at short distances, and the horizontal angles are smaller for objects at long distances.

In addition, where the horizontal angle intervals between point clouds are not uniform as such a case where intervals are reduced in order to sense a particular area specifically, adjustment of the number of point clouds by thinning out point clouds so as to obtain the horizontal angles between the point clouds, which are kept, being uniform may not be performed, and point clouds may be kept every predetermined number of point clouds even if the horizontal angle intervals are made ununiform.

Figure 16:
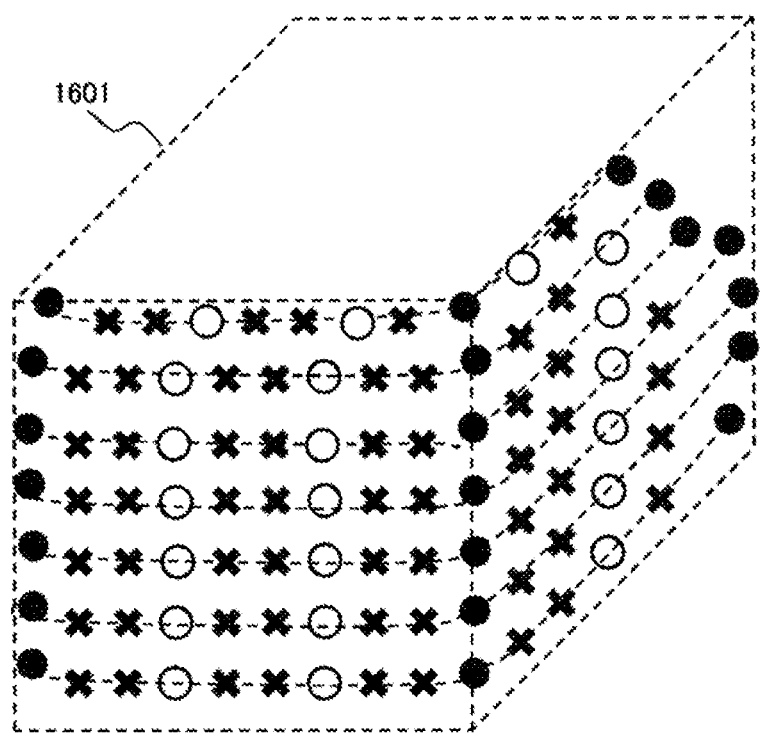
FIG. 16 is an explanatory diagram depicting locations in the vertical direction to which point clouds are applied in a case of the same horizontal angles.

In addition, where a method in which point clouds are kept always at predetermined intervals or at predetermined angles is used, and point clouds are applied in the vertical direction as depicted in FIG. 16, if black circles are point clouds to be kept at ends or corners, white circles are point clouds to be kept at predetermined intervals or predetermined angles, and X marks are point clouds to be eliminated, point clouds at the same horizontal angles are kept consecutively in the vertical direction, and point clouds on an object that are at particular horizontal angles are kept in an imbalance manner.

Figure 17:
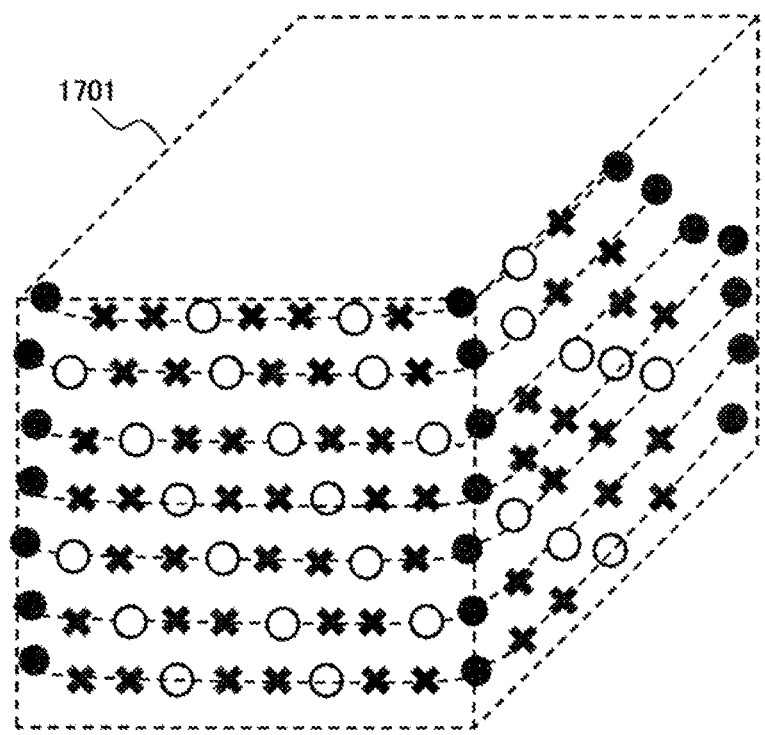
FIG. 17 is an explanatory diagram depicting locations in the vertical direction to which point clouds are applied in a case of different horizontal angles.

In view of this, as depicted in FIG. 17, horizontal angles of point clouds to be kept at predetermined intervals or predetermined angles may be made different depending on their vertical angles such that point clouds at the same horizontal angles are not kept consecutively in the vertical direction, and point clouds to be eliminated are not located at particular portions in an imbalanced manner.

At this time, the degree of the differences may be changed randomly within a predetermined range.

(Elimination of Point Clouds in Vertical Direction)

In addition, a point cloud elimination process can be performed, similarly to that for the horizontal direction, not only on a row of point clouds corresponding to one certain layer extending in the horizontal direction, but also on rows of point clouds in the upward/downward direction, which are on layers overlap one another in the vertical direction.

In other words, the processor performs point cloud elimination processes not only on a row of point clouds that are arrayed in one direction, but also on a row of point clouds that are arrayed in another direction. Thereby, point clouds can be eliminated in two directions. As a result, the point cloud processing load can be reduced further. Note that although the two directions are orthogonal to each other in the present embodiment, they may not be orthogonal to each other.

Figure 18:
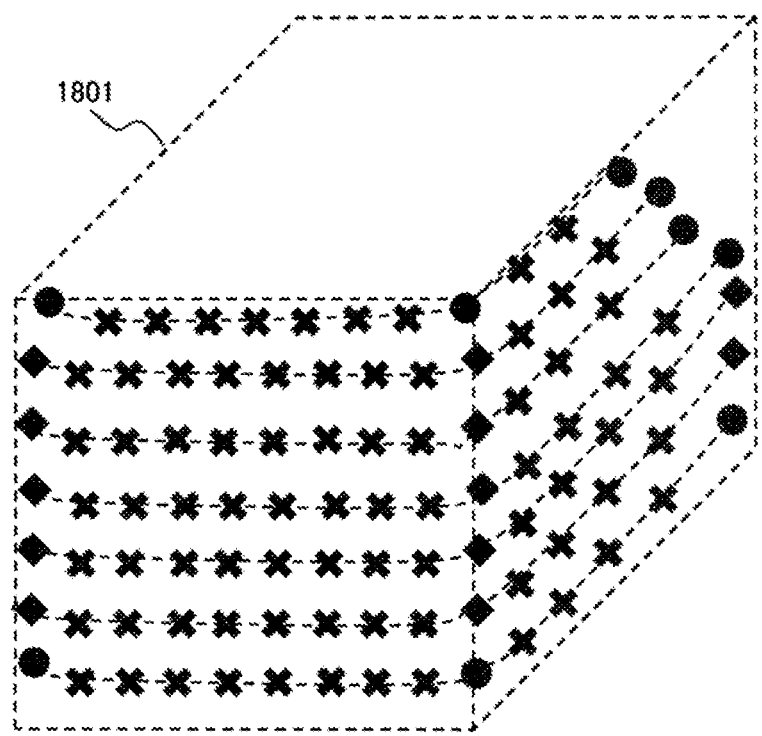
FIG. 18 is an explanatory diagram depicting a case where a point cloud elimination process is applied also in the vertical direction.

Where, as a result of performing an elimination process in the horizontal direction as in FIG. 18, point clouds represented by X marks are eliminated, and point clouds represented by black circles and black diamond marks are kept, if elimination processes are performed on point clouds that are at the same horizontal angles and overlap one another in the vertical direction similarly to those for the horizontal direction, the point clouds represented by the black diamond marks are eliminated further, and only the point clouds represented by the black circles are kept.

The remaining point clouds represented by the black circles are sufficient as portions corresponding to vertices to be used when the circumference of a vehicle is boxed, and a circumscribing rectangular parallelepiped like a box 1801 can be created. Accordingly, boxing is possible even if point clouds are eliminated in the vertical direction.

Note that since it is supposed here that the lower end to be used in boxing is the position of a road surface, the lower end of the box 1801 is not set at the positions of point clouds detected at the lowest height, but at the position of a road surface at a height which is equal to 0.

Where point clouds are eliminated by a processing method like the one described above, it is possible to maintain the shape and the size of a circumscribing rectangle even if point clouds are eliminated, provided that an object is at a relatively short distance, and there are a sufficient number of point clouds.

However, where an object is at a relatively long distance, and the number of point clouds is small, there are not point clouds that satisfy conditions for enabling elimination, or the number of point clouds that can be eliminated, if any, is small. Accordingly, an elimination process is not performed on point clouds that are at distances longer than a predetermined threshold. This is because such an elimination process provides only small processing time reduction advantages, point clouds necessary for creating a circumscribing rectangle or for boxing are lost, and the possibility of influence on the detection performance increases.

(Operation)

Figure 19:
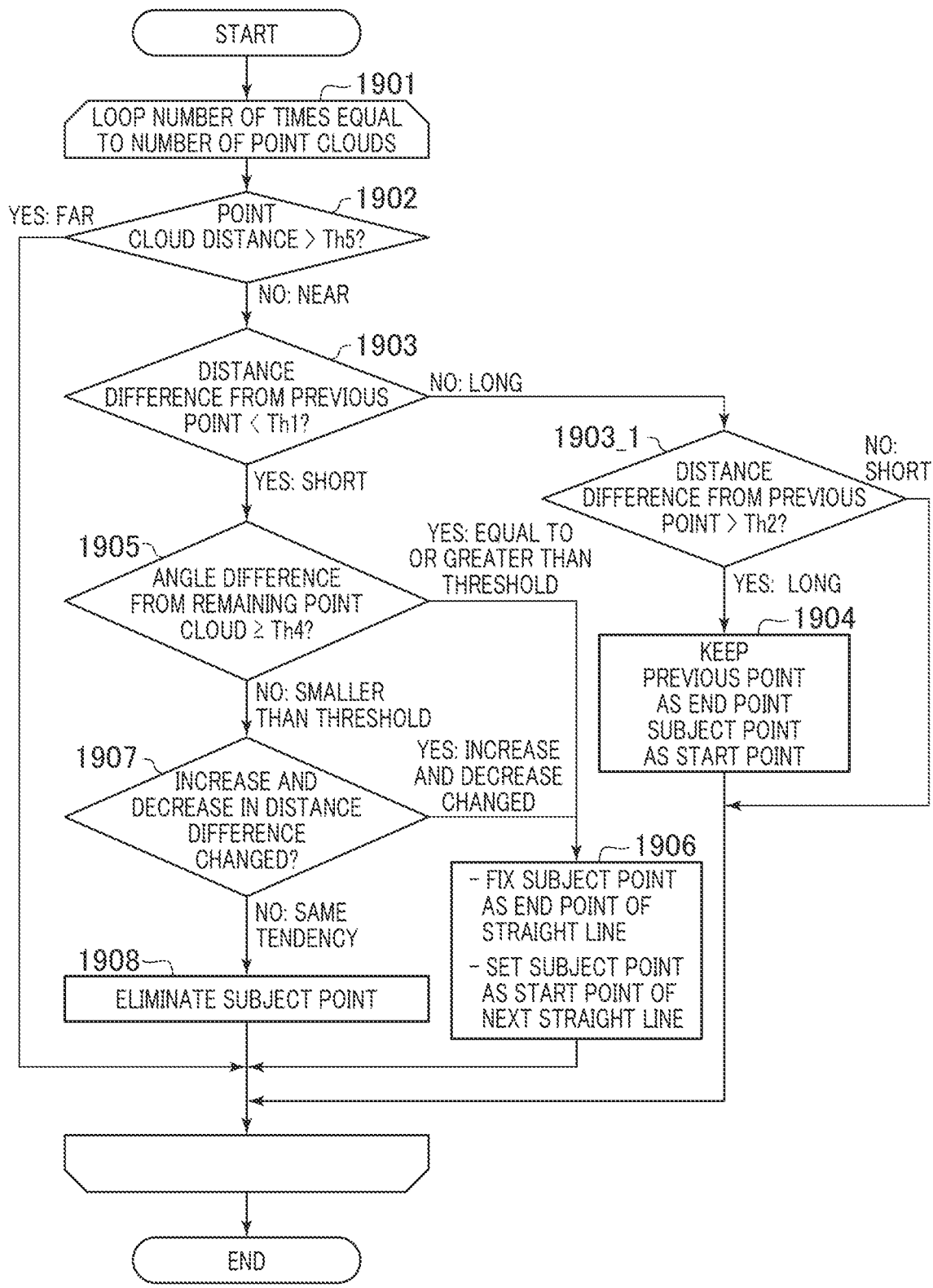
FIG. 19 is a flowchart of the point cloud elimination process.

Operation based on a flowchart in FIG. 19 is as follows. Note that, for example, a processor performs the operation.

Step 1901: An elimination process is performed on each point cloud, repeating a loop a number of times which is equal to the number of point clouds.

Step 1902: The distance to a point cloud is compared with a predetermined threshold (fifth threshold Th5). When the distance is longer than the threshold, the elimination process is not performed. When the distance is shorter than the threshold, the procedure proceeds to Step 1903.

For example, when the distance to a second point (subject point) is longer than the fifth threshold Th5 (Step 1902: YES), the processor keeps data of the second point (subject point) uneliminated. Here, the fifth threshold Th5 is several dozen meters.

Thereby, point clouds corresponding to distant objects can be kept. As a result, it is possible to suppress decrease in precision of sensing of a distant object that is likely to provide smaller number of point clouds. Note that the distance to the point is a distance (measurement value) from a Lidar (an apparatus to acquire point clouds) to the point.

Step 1903: A distance difference from the previous point cloud is compared with a predetermined threshold (first threshold Th1). When the distance difference is longer than the threshold, the procedure proceeds to Step 1904, and when the distance difference is shorter than the threshold, the procedure proceeds to Step 1903_1.

Step 1903_1: A distance difference from the previous point cloud is compared with a predetermined threshold (second threshold Th2). When the distance difference is longer than the threshold, the procedure proceeds to Step 1904, and when the distance difference is shorter than the threshold, the procedure proceeds to Step 1901.

Step 1904: The previous point cloud is determined as an end point of the previous object (an object belonging to the previous group), the subject point cloud is determined as a start point of another new object, and the point clouds are kept uneliminated.

For example, the processor decides, when the difference between the distance to the first point (previous point) and the distance to the second point (subject point) is greater than the second threshold Th2 (Step 1903_1: YES), that the first point and the second point belong to mutually different objects, and keeps data of the first point (previous point) and the second point (subject point) which are at the boundary between the objects uneliminated (Step 1904). Here, the second threshold Th2 is approximately 1 m. If the second threshold Th2 is too small, a single object is divided, and if the second threshold Th2 is too great, a subject object is combined with another object.

Thereby, point clouds at the boundary of objects can be kept. As a result, the precision of sensing of objects can be maintained.

Step 1905: An angle difference or a distance difference from the closest point cloud which is kept uneliminated is compared with a predetermined threshold (fourth threshold Th4). When the angle difference or the distance difference is equal to or greater than the threshold, the procedure proceeds to Step 1906, and when the angle difference or the distance difference is smaller than the threshold, the procedure proceeds to Step 1907.

For example, when the angle difference or the distance difference between the first point (remaining point) and the second point (subject point) is equal to or greater than the fourth threshold Th4 (Step 1905: YES), the processor keeps the data of the second point uneliminated (Step 1906). Here, the fourth threshold Th4 is several degrees when the fourth threshold Th4 is defined as an angle, and is several dozen centimeters when the fourth threshold Th4 is defined as a distance.

Thereby, point clouds can be kept at predetermined intervals. As a result, it is possible to avoid a situation where all point clouds corresponding to a gentle curve of an object are eliminated.

Step 1906: The subject point cloud is not eliminated, but is determined as an end point of a shortcut straight line to fix the portion of the shortcut straight line, and additionally is set as a start point of the next shortcut straight line.

Step 1907: when the pattern of changes in increase and decrease in the distance difference from the previous point cloud and the previous distance difference satisfies a condition used to determine point clouds to be kept, the procedure proceeds to Step 1906, and when the pattern satisfies a condition used to determine point clouds to be eliminated, the procedure proceeds to Step 1908. Specifically, when there is a change in terms of an increase and a decrease (e.g. a change from a minus sign to a plus sign), the procedure proceeds to Step 1906, and when the tendency remains the same, that is, there is not a change in terms of an increase and a decrease (e.g. there are consecutive minus signs), the procedure proceeds to Step 1908.

For example, when the sign of a first distance change amount representing the difference between the distance to the second point and the distance to the first point, and the sign of a second distance change amount representing the difference between the distance to the second point and the distance to a third point which is included in the point cloud and is next to the second point are different (Step 1907: YES), the processor keeps the data of the second point uneliminated (Step 1906).

Thereby, point clouds corresponding to inflection points can be kept. As a result, the precision of sensing of the positions, sizes, or shapes of objects can be maintained.

In addition, as explained by using FIG. 12, the processor may determine the first distance change amount as 0 when the first distance change amount is smaller than the third threshold, additionally determine the second distance change amount as 0 when the second distance change amount is smaller than the third threshold, and keep the data of the second point uneliminated when the state (+, −, or 0) of the sign of the first distance change amount and the state (+, −, or 0) of the sign of the second distance change amount are different.

Thereby, it is possible to keep point clouds corresponding to corners of objects while eliminating point clouds corresponding to small protrusions and recesses of the objects. As a result, it is possible to ensure the precision of sensing of the positions, sizes, or shapes of objects while further reducing the point cloud processing load.

Step 1908: The subject point cloud is eliminated.

Whereas there are four conditions (Steps 1902, 1903, 1905, and 1907) used to determine whether to eliminate a subject point in the present embodiment, one or more conditions may be deleted.

For example, the processor may eliminate the data of the second point (subject point) which is included in the point cloud and is next to the first point (previous point) which is included in the point cloud from the data of the point cloud when the difference between the distance to the first point and the distance to the second point is smaller than the threshold (first threshold Th1) (Step 1903: shorter) (Step 1908). Note that the memory (storage apparatus) stores the data of the point cloud of the object. Here, the first threshold Th1 is several to several dozen centimeters.

Thereby, it is possible to delete point clouds according to the distance between two adjacent points. As a result, for example, it is possible to delete point clouds that are arrayed next to each other linearly. In addition, the point cloud processing load is reduced, and it is possible to recognize an object in a predetermined length of time (real-time property). In particular, the point cloud processing load can be suppressed even if the number of points included in point clouds increases due to realization of high resolution of apparatuses (e.g. Lidars) that acquire point clouds of objects.

(Other Modification Examples)

The object of elimination of point clouds is to reduce the overall processing amount including a recognition process and the like, and a point cloud elimination process is performed by a method that requires a low processing load for point cloud elimination even when there are some point clouds to be not eliminated, rather than eliminating as many point clouds that can be eliminated as possible without exceptions.

Note that the number of point clouds on objects having the same size are related to the distances to the objects, and decrease as the distances increase. Accordingly, not the number of point clouds, but the distances to point clouds may be compared with a threshold, and a point cloud elimination process may not be performed when the distances to some or all of point clouds applied to an object are longer than the threshold distance.

In addition, whereas the point cloud elimination process described above is performed at the stage of a polar coordinate system in order to reduce the number of pieces of point cloud data on which a process for conversion into an orthogonal (XYZ) coordinate system is executed, a point cloud elimination process may be performed after all the pieces of the point cloud data are converted into data in the orthogonal coordinate system. In this case, a point cloud data elimination process is performed in the X-axis direction and the Y-axis direction, and point clouds that have become elimination subject point clouds in both or one of the X-axis direction and the Y-axis direction are eliminated.

Where there are many objects in the surroundings, the overall number of point clouds applied to objects increases; as a result, the number of point clouds to be eliminated also increases, and a certain degree of processing load reduction can be expected. However, where there are few objects in the surroundings, the number of point clouds to be eliminated also decreases, and there is a possibility that the processing load reduction amount decreases.

Where all point clouds are treated, it is not possible to perform processes in real time in predetermined periods. Where the processing load is lowered by performing a point cloud elimination process, and it is made possible to perform real time processes, it is necessary to have always eliminated a certain number of point clouds in advance. However, there is a fear that real-time property cannot be maintained if there is a period (frame) in which the point cloud elimination amount is small due to a condition about the position of an object or the like.

In view of this, in order to make it possible to eliminate a certain number of point clouds even in a case of bad conditions, a process is performed to eliminate point clouds in predetermined areas or averagely when it is considered that the expected number of point clouds to be eliminated is smaller than a predetermined threshold, on the basis of information about the number, positions and sizes of objects detected in the previous frame, and furthermore the number of point clouds eliminated in the previous frame.

In other words, the processor may eliminate data of a point cloud included in a predetermined region when the number of uneliminated points to be kept in points included in the point cloud exceeds or is predicted to exceed a predetermined threshold (sixth threshold Th6). Here, the sixth threshold Th6 is several dozen thousands to several hundred thousands, and is the target maximum value of point clouds to be kept (the number of point clouds that can be processed within a prescribed length of time).

Thereby, even if the number of points that are kept uneliminated is great, it is possible to eliminate a certain number of point clouds.

In this case, it is considered that there are no objects in the surroundings, the possibility of an immediate collision or contact with some object is low, and accordingly there is no significant influence even if a process of eliminating point clouds is performed.

As a specific elimination method, elimination is performed mechanically at predetermined intervals such that a predetermined elimination rate is attained, one layer in a plurality of layers that overlap one on another is eliminated entirely, point clouds are thinned out according to a predetermined rule, and so on.

In addition, since it is likely that there is an important object at the middle portion of a viewing angle, point clouds within predetermined areas close to the ends of the viewing angle are eliminated entirely or partially to reduce the number of point clouds.

Figure 20A:
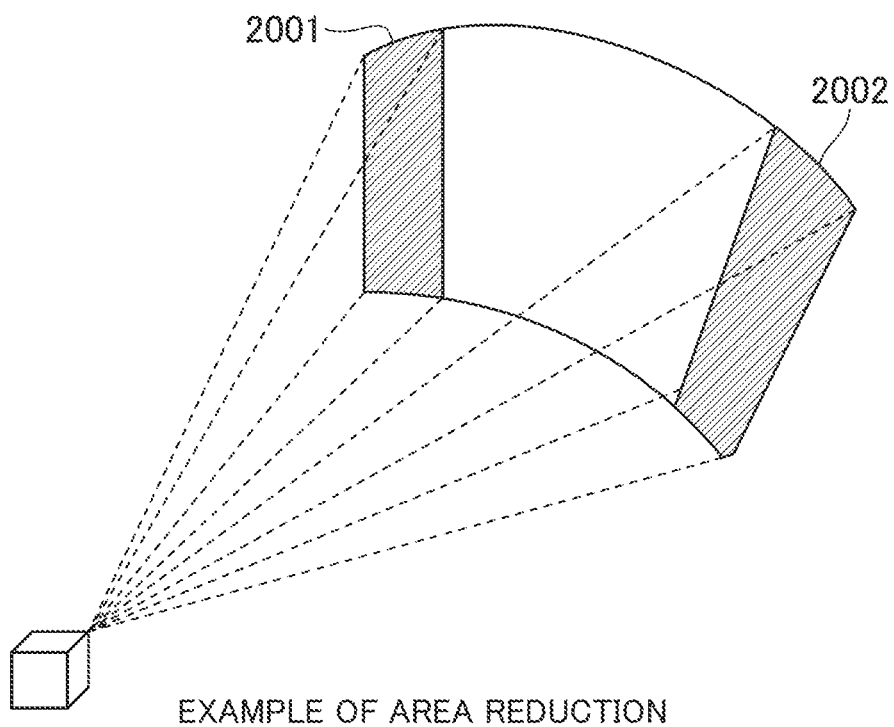
FIG. 20A is an explanatory diagram depicting point cloud elimination areas within a horizontal viewing angle.
Figure 20B:
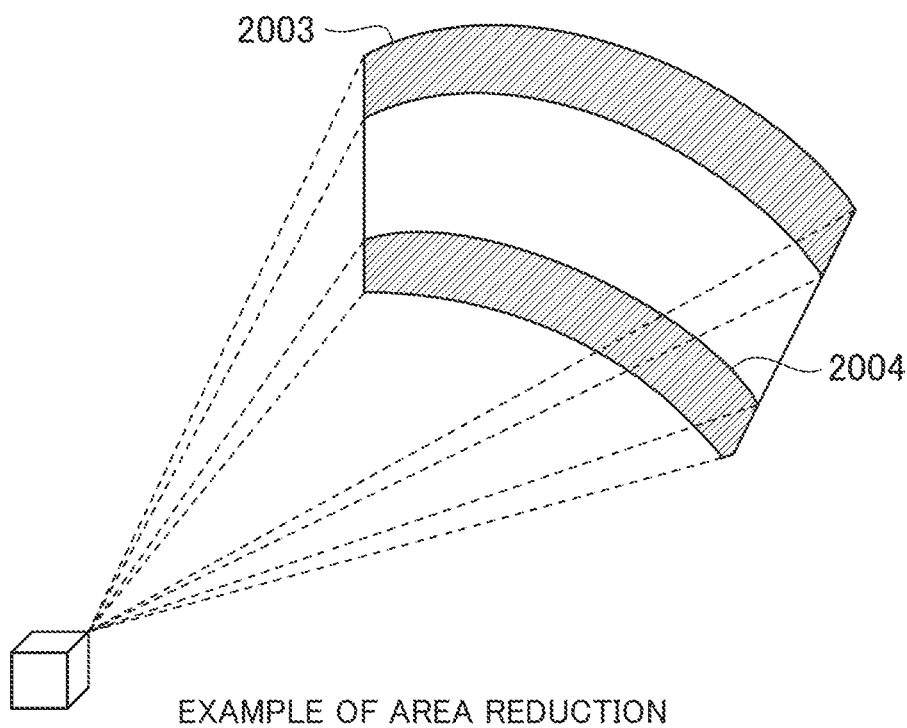
FIG. 20B is an explanatory diagram depicting point cloud elimination areas within a vertical viewing angle.

Specifically, point clouds in predetermined areas on both sides in the horizontal direction like a region 2001 and a region 2002 in FIG. 20A or point clouds in predetermined areas in the upward/downward direction in the vertical direction like a region 2003 and a region 2004 in FIG. 20B are eliminated.

Areas to be eliminated are preset, but the areas may be increased or decreased according to a target value of the point cloud elimination amount.

In addition, whereas the same width (viewing angle) is set for the region 2001 and the region 2002 as areas to be eliminated in the horizontal direction, the area of the region 2002 located on the right side may be reduced such that detection of a road on the side of an opposite lane, structures around the road, and the like is hindered less. It should be noted that, when the subject vehicle is travelling on a lane on the right side of a road where there is a plurality of lanes separated by a median, it is better to reduce the area of the left region 2001 such that detection on the side of a left lane is influenced less, and accordingly, the area may be changed successively according to roads and travel conditions.

Note that all the descriptions above are about a case of left-hand traffic, and left and right is reversed in a case of right-hand traffic.

Regarding the vertical direction also, whereas the same width (viewing angle) is set for the region 2003 and the region 2004, the area of the bottom region 2004 may be reduced, placing importance on road surface conditions.

At this time, there is a fear that a failure of detection of an object occurs if point clouds in the same area are always kept being eliminated. Accordingly, it is attempted to avoid a situation where only a particular area is kept being eliminated consecutively, by eliminating only the right end side and only the left end side alternately in the horizontal direction, eliminating only the upper end side and only the lower end side alternately in the vertical direction, performing elimination in the horizontal direction and the vertical direction alternately, and so on.

Note that whereas FIGS. 20A and 20B depict areas at particular distances for explanation, laser beams that are radiated onto areas passing through the region 2001 to the region 2004 are subject laser beams, and the same applies also to a case where the laser beams are applied to objects before and after the depicted portions.

Figure 21:
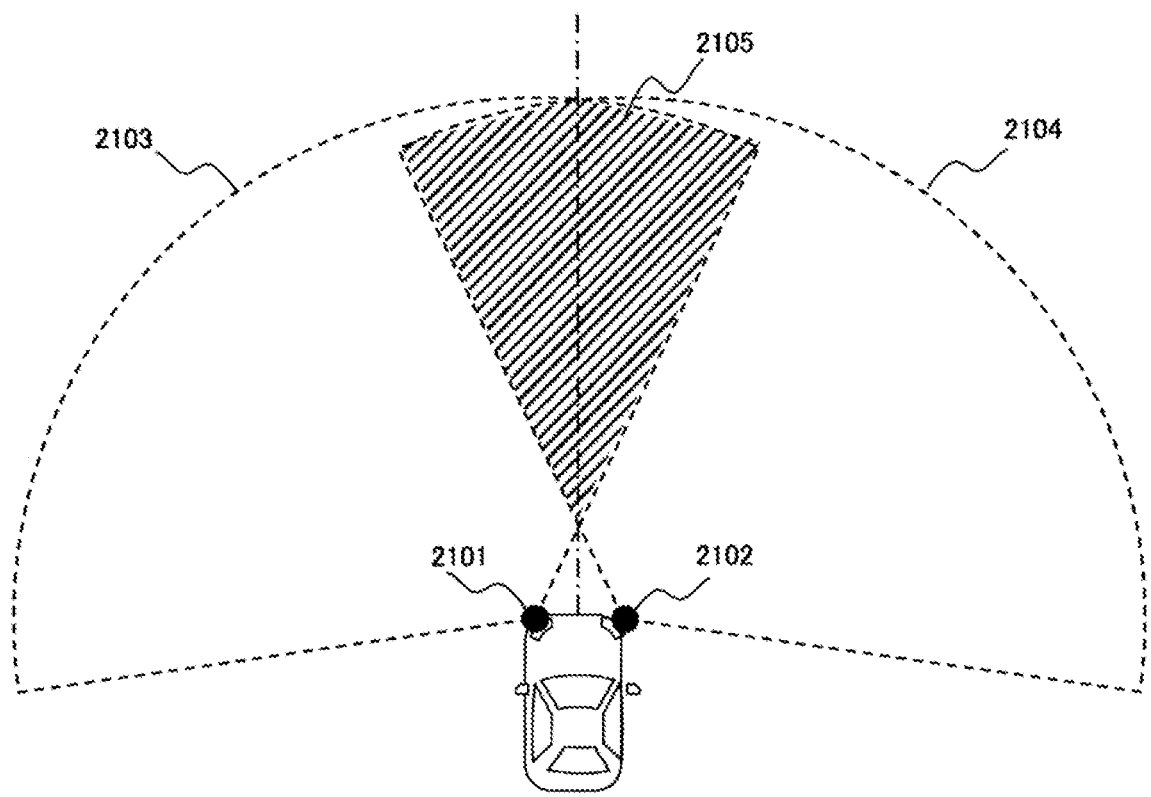
FIG. 21 is an explanatory diagram depicting a point cloud elimination area when detection areas of two Lidars overlap.

In addition, as in FIG. 21, there is an overlapping region 2105 (a region represented by diagonal lines) where detection overlaps when two Lidars are installed to point the forward direction, the detection area of a Lidar 2101 is a region 2103, and the detection area of a Lidar 2102 is a region 2104.

Since it is possible to decide whether or not each piece of point cloud data is within the area of the overlapping region 2105 on the basis of the horizontal angle and distance of the piece of the point cloud data, all or some of point clouds whose positions acquired by the Lidar 2102 are within the overlapping region 2105 may be eliminated (conversely, point clouds acquired by the Lidar 2101 may be eliminated).

Alternatively, regarding the left half of the overlapping region 2105, point clouds of the Lidar 2102 may be eliminated, and regarding the right half of the overlapping region 2105, point clouds of the Lidar 2101 may be eliminated.

In addition, every other point cloud of each Lidar in the overlapping region 2105 may be eliminated. Thereby, half of point clouds of each Lidar may be thinned out, and the point cloud density may be made equivalent to that in non-overlapping regions.

Note that whereas FIG. 21 depicts areas up to a particular distance for explanation, laser beams that reach locations farther than the region 2103 to the region 2105 are also subject laser beams, and regions farther than the depicted portions are included also.

Point clouds are eliminated depending on regions in the methods explained in the descriptions above. However, when the movement speed of the subject automobile is slow, the necessity for detecting/recognizing objects at short intervals lowers. Accordingly, it may be made possible to maintain the real-time property by making detection intervals long even if the processing time cannot be reduced because point clouds are not eliminated.

In addition, when there are fewer objects in the surroundings, there are fewer objects on which a process of updating the position and the size of an object and a process of tracking a moving object need to be performed, and the processing load at a latter stage after recognition lowers, point clouds may not be eliminated from predetermined areas or averagely.

Since the situation related to distribution/sensing of point clouds in a viewing angle does not change rapidly in one cycle, the elimination method and the elimination amount in the next cycle may be controlled according to the total number of point clouds in the previous one frame or one past frame, the number of point clouds having been eliminated in an elimination process using the distances between point clouds or the like, and the number of point clouds having been eliminated from predetermined areas or averagely.

Other than this, the real-time property may be maintained by performing processes on an amount of objects on which the processes can be performed within the length of time of one cycle, starting with objects that are closer to the subject automobile.

As explained above, according to the present embodiment, the point cloud processing load can be suppressed even if the number of points included in point clouds increases due to realization of high resolution of apparatuses that acquire point clouds of objects.

Note that the present invention is not limited to the embodiments described above, and includes various modification examples. For example, the embodiments mentioned above are explained in detail in order to explain the present invention in an easy-to-understand manner, and the present invention is not necessarily limited to embodiments including all the configurations explained. In addition, it is possible to replace some of the configurations of an embodiment with configurations of another embodiment, and it is also possible to add a configuration of an embodiment to the configurations of another embodiment. In addition, some of the configurations of each embodiment can be subjected to addition of another configuration, deletion, or replacement.

Whereas Lidars are adopted as apparatuses that acquire point clouds of objects by using beams in the embodiments described above, apparatuses that acquire point clouds by using radio waves may be adopted. That is, means for acquiring point clouds can be any means.

In addition, the configurations, functionalities, and the like described above may be partially or entirely realized by hardware by, for example, designing it in an integrated circuit, and so on. In addition, the configurations, functionalities, and the like described above may be realized by software by a processor (microcomputer) interpreting and executing a program to realize the functionalities. Information such as a program, a table, or a file to realize the functionalities can be placed on a recording apparatus such as a memory, a hard disk, or an SSD (Solid State Drive), or a recording medium such as an IC card, an SD card, or a DVD.

Note that embodiments of the present invention may be the following aspects. The object is to reduce the number of pieces of point cloud data, and reduce the processing load, that is, increase the processing speed while maintaining the performance of sensing/recognition of objects. This is achieved by keeping uneliminated point clouds at characteristic positions necessary for identifying the positions and the sizes of objects, reducing the number of pieces of point cloud data by eliminating an intermediate portion of a straight portion where there are a series of a plurality of point clouds, and keeping information necessary for grasping the position, size, and shape of an object by creating an approximate shortcut straight line between end points of the straight portion.

(1). A point cloud data elimination method and a processing apparatus that processes point cloud data obtained by a light detecting and ranging apparatus (Lidar), in which, when a distance difference between the point cloud data and a neighborhood point (next point) of the point cloud data is smaller than a first threshold, the neighborhood point is eliminated.

(2). The elimination method and processing apparatus according to (1), in which, when a distance difference between point cloud data and a neighborhood point (next point) of the point cloud data is greater than a second threshold, it is decided that each of point clouds are point clouds belonging to different objects, the point clouds are managed separately as belonging to the different objects, and the point cloud data at a boundary between the objects is not eliminated.

(3). The elimination method and processing apparatus according to (1), in which, when a distance change amount 1 of point cloud data and a neighborhood point (next point) of the point cloud data and a distance change amount 2 of the next point and a neighborhood point (a point next to the next point) have different states regarding increase and decrease, the point clouds are not eliminated.

(4). The elimination method and processing apparatus according to (3), in which, when a difference between the distance change amount 1 and the distance change amount 2 is smaller than a third threshold, it is determined that there is neither an increase nor a decrease between the distance change amount 1 and the distance change amount 2, but there is no-change, and when the distance change amount 1 and the distance change amount 2 have different states regarding increase, decrease, or no-change, the point clouds are not eliminated.

(5). The elimination method and processing apparatus according to (1), in which, where an angle difference or distance difference from a reference point (start point) included in point cloud data of the short distance difference exceeds a fourth threshold, the point cloud data is not eliminated even if an elimination condition is satisfied.

(6). The elimination method and processing apparatus according to (1), in which, when a distance of point cloud data is greater than a fifth threshold, a point cloud elimination process is not performed.

(7). The elimination method and processing apparatus according to (1), in which, when number of pieces of point cloud data that is kept uneliminated exceeds or is predicted to exceed a sixth threshold, all or some of pieces of point cloud data included in a predetermined region are eliminated.

(8). The elimination method and processing apparatus according to (1) to (7), in which point cloud data that is kept uneliminated and is immediately before eliminated point cloud data, and next point cloud data that is kept unelimianted are connected to each other by a shortcut straight line, and stored.

(9). The elimination method and processing apparatus according to (1) to (8), in which a point cloud elimination process is performed not only on a row of point clouds in a predetermined direction, but also on a row of point clouds in another direction orthogonal to the predetermined direction.

According to (1) to (9), only point cloud data that does not influence detection of objects is eliminated; as a result, the number of overall pieces of point cloud data is reduced without lowering the object detection performance, and the length of time necessary for a point cloud data process is reduced. Thereby, increase in the processing load can be reduced even if the number of point clouds to be output increases due to realization of high resolution of Lidars.

DESCRIPTION OF REFERENCE CHARACTERS

101: Lidar
102: Data input processing section
103: Point cloud data storage section
104: Point cloud data eliminating section
105: Shortcut straight line storage section
106: Object detecting/boxing processing section
107: Object information storage section
108: Object recognition processing section
701: Vehicle having protrusion
702: Circumscribing rectangle where there is protrusion
703: Circumscribing rectangle from which protrusion protrudes
1001: Vehicle having concave portion
1002: Circumscribing rectangle where there is concave portion
1501: Circumscribing rectangle where there is curved portion
1502: Circumscribing rectangle where curved portion protrudes from circumscribing rectangle
1503: Shortcut straight line linking point cloud (1) and point cloud (5)
1504: Shortcut straight line linking point cloud (5) and point cloud (9)
1505: Shortcut straight line linking point cloud (10) and point cloud (13)
1506: Shortcut straight line linking point cloud (13) and point cloud (15)
2001, 2002, 2003, 2004: Region where point clouds are eliminated
2105: Overlapping region of detection by two Lidars

The invention claimed is:

1. A processing apparatus comprising:
a storage apparatus that stores data of a point cloud of an object; and
a processor that eliminates data of a second point that is included in the point cloud and is next to a first point that is included in the point cloud from the data of the point cloud when a difference between a distance to the first point and a distance to the second point is smaller than a first threshold, wherein
the processor keeps the data of the second point uneliminated when a sign of a first distance change amount representing a difference between the distance to the second point and the distance to the first point, and a sign of a second distance change amount representing a difference between the distance to the second point and a distance to a third point that is included in the point cloud and is next to the second point are different from each other.

2. The processing apparatus according to claim 1, wherein the processor
decides that the first point and the second point belong to mutually different objects when the difference between the distance to the first point and the distance to the second point is greater than a second threshold, and keep data of the first point and the second point that are located at a boundary between the objects uneliminated.

3. The processing apparatus according to claim 1, wherein the processor
determines the first distance change amount as 0 when the first distance change amount is smaller than a third threshold, and determines the second distance change amount as 0 when the second distance change amount is smaller than the third threshold, and
keeps the data of the second point uneliminated when a state of a sign of the first distance change amount and a state of the sign of the second distance change amount are different from each other.

4. The processing apparatus according to claim 1, wherein the processor
keeps the data of the second point uneliminated when an angle difference or a distance difference between the first point and the second point is equal to or greater than a fourth threshold.

5. The processing apparatus according to claim 1, wherein the processor
keeps the data of the second point uneliminated when the distance to the second point is longer than a fifth threshold.

6. The processing apparatus according to claim 1, wherein the processor
eliminates data of a point cloud included in a predetermined region when number of uneliminated points to be kept in points included in the point cloud exceeds or is predicted to exceed a sixth threshold.

7. The processing apparatus according to claim 1, wherein the processor
stores a straight line that connects one uneliminated point to be kept and an uneliminated point to be kept to each other, the uneliminated point to be kept being next to the one point.

8. The processing apparatus according to claim 1, wherein the processor
performs a elimination process of the point cloud not only on a row of point clouds in one direction, but also on a row of point clouds in another direction.

9. A point cloud elimination method that causes a processing apparatus to execute:
a step of storing data of a point cloud of an object;
a step of eliminating data of a second point that is included in the point cloud and is next to a first point that is included in the point cloud from the data of the point cloud when a difference between a distance to the first point and a distance to the second point is smaller than a first threshold, wherein
the processor keeps the data of the second point uneliminated when a sign of a first distance change amount representing a difference between the distance to the second point and the distance to the first point, and a sign of a second distance change amount representing a difference between the distance to the second point and a distance to a third point that is included in the point cloud and is next to the second point are different from each other.

* * * * *